US012739675B2

(12) United States Patent
Laselva et al.

(10) Patent No.: US 12,739,675 B2
(45) Date of Patent: Sep. 15, 2026

(54) UE BASED PDCCH MONITORING ADAPTATION DURING SDT

(71) Applicant: Nokia Technologies Oy, Espoo (FI)

(72) Inventors: Daniela Laselva, Aalborg (DK); Jorma Johannes Kaikkonen, Oulu (FI); Samuli Heikki Turtinen, Oulu (FI); Jussi-Pekka Koskinen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 333 days.

(21) Appl. No.: 18/570,946

(22) PCT Filed: Jun. 20, 2022

(86) PCT No.: PCT/IB2022/055726
§ 371 (c)(1),
(2) Date: Dec. 15, 2023

(87) PCT Pub. No.: WO2022/269474
PCT Pub. Date: Dec. 29, 2022

(65) Prior Publication Data

US 2024/0373265 A1 Nov. 7, 2024

Related U.S. Application Data

(60) Provisional application No. 63/213,839, filed on Jun. 23, 2021.

(51) Int. Cl.
*H04W 24/08* (2009.01)
*H04L 5/00* (2006.01)
(Continued)

(52) U.S. Cl.
CPC ........... *H04W 24/08* (2013.01); *H04L 5/0053* (2013.01); *H04W 74/0833* (2013.01); *H04W 74/0836* (2024.01); *H04W 76/27* (2018.02)

(58) Field of Classification Search
CPC ............. H04W 24/08; H04W 74/0833; H04W 74/0836; H04W 76/27; H04W 76/18;
(Continued)

(56) References Cited

U.S. PATENT DOCUMENTS

| | | | | |
|---|---|---|---|---|
| 2012/0281566 | A1 | 11/2012 | Pelletier et al. | |
| 2022/0225368 | A1* | 7/2022 | Khoshnevisan .. | H04W 72/1273 |

OTHER PUBLICATIONS

"3rd Generation Partnership Project; Technical Specification Group Services and System Aspects; Feasibility Study on New Services and Markets Technology Enablers; Stage 1 (Release 14)", 3GPP TR 22.891, V14.2.0, Sep. 2016, pp. 1-95.

(Continued)

*Primary Examiner* — Sujoy K Kundu
*Assistant Examiner* — Raul Rivas
(74) *Attorney, Agent, or Firm* — Robert P. Michal, Esq.; Rimon PC

(57) ABSTRACT

An apparatus may be configured to: receive a configuration for physical downlink control channel monitoring; transmit, to a base station, a (small) data transmission; select a physical downlink control channel monitoring pattern based, at least, on the configuration and information of the data transmission; and perform, with a user equipment, physical downlink control channel monitoring based on the selected physical downlink control channel monitoring pattern. An apparatus may be configured to: transmit, to a user equipment, a configuration for physical downlink control channel monitoring; receive, from the user equipment, a (small) data transmission; select a physical downlink control channel monitoring pattern based, at least, on the configuration and at least one of: information of the data transmission, or a physical random access channel preamble received from the user equipment; and transmit, to the user equipment, a transmission based on the selected physical downlink control channel monitoring pattern.

1 Claim, 7 Drawing Sheets

(51) Int. Cl.
*H04W 74/0833* (2024.01)
*H04W 74/0836* (2024.01)
*H04W 76/27* (2018.01)

(58) Field of Classification Search
CPC ............. H04W 52/0229; H04L 5/0053; Y02D 30/70
See application file for complete search history.

(56) References Cited

OTHER PUBLICATIONS

"Work Item on NR smalldata transmissions in INACTIVE state", 3GPP TSG RAN Meeting #88e, RP-201305, Agenda: 9.1.2, ZTE Corporation, Jun. 29-Jul. 3, 2020, 5 pages.
"3rd Generation Partnership Project; Technical Specification Group Services and System Aspects; Feasibility study on 5G message service for MioT; Stage 1 (Release 16)", 3GPP TR 22.824, V16.0.0, Sep. 2018, pp. 1-27.
"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.
"Revised WID UE Power Saving Enhancements for NR", 3GPP TSG RAN meeting #88e, RP-200938, Agenda: 9.10.7, Media Tek Inc., Jun. 29-Jul. 3, 2020, 5 pages.
"Reply LS on physical layer aspects of small data transmission", 3GPP TSG-RAN WG1 Meeting #104-e, R1-2102125, RAN1, Jan. 25-Feb. 5, 2021, 2 pages.
"3rd Generation Partnership Project; Technical Specification Group Radio Access Network; NR; Physical layer procedures for control (Release 16)", 3GPP TS 38.213, V16.5.0, Mar. 2021, pp. 1-183.
"Report of [Post113bis-e][507][SDT] Resource configuration aspects", 3GPP TSG-RAN WG2 Meeting #114-electronic, R2-2104762, Agenda: 8.6.4, vivo, May 19-27, 2021, 28 pages.
International Search Report and Written Opinion received for corresponding Patent Cooperation Treaty Application No. PCT/IB2022/055726, dated Oct. 11, 2022, 15 pages.
"PDCCH monitoring in RA-based SDT procedure", 3GPP TSG-RAN WG2 Meeting #114 electronic, R2-2104965, Agenda: 8.6.4, Asia Pacific Telecom, May 19-27, 2021, 5 pages.
"Required changes to NR using existing DL/UL NR waveforms", 3GPP TSG RAN WG1 #102-e,8.2.1, Nokia, Aug. 17-29, 2020, 32 pages.
Office action received for corresponding European Patent Application No. 22736374.4, dated Feb. 3, 2026, 9 pages.

* cited by examiner

| PDCCH monitoring pattern for two groups | | | | | | | | | | | | | | | | | | | | | | |
|---|---|---|---|---|---|---|---|---|---|---|---|---|---|---|---|---|---|---|---|---|---|---|
| | slot | 0 | 1 | 2 | 3 | 4 | 5 | 6 | 7 | 8 | 9 | 10 | 11 | 12 | 13 | 14 | 15 | 16 | 17 | 18 | 19 | 20 |
| Cell# | SS group | | | | | | | | | | | | | | | | | | | | | |
| 0 (Pcell) | 0 | | | | | | | | | | | | | | | | | | | | | |
| 0 (Pcell) | 1 | | | | | | | | | | | | | | | | | | | | | |
| 1 (Scell) | 0 | | | | | | | | | | | | | | | | | | | | | |
| 1 (Scell) | 1 | | | | | | | | | | | | | | | | | | | | | |

FIG. 3

600 receive a configuration for physical downlink control channel monitoring

610

transmit, to a base station, a data transmission

620

select a physical downlink control channel monitoring pattern based, at least, on the configuration and information of the data transmission

630

perform, with a user equipment, physical downlink control channel monitoring based on the selected physical downlink control channel monitoring pattern

700 transmit, to a user equipment, a configuration for physical downlink control channel monitoring

710

receive, from the user equipment, a data transmission

720

select a physical downlink control channel monitoring pattern based, at least, on the configuration and at least one of: information of the data transmission, or a physical random access channel preamble received from the user equipment

730

transmit, to the user equipment, a transmission based on the selected physical downlink control channel monitoring pattern

UE BASED PDCCH MONITORING ADAPTATION DURING SDT

BACKGROUND

Technical Field

The example and non-limiting embodiments relate generally to small data transmission and, more particularly, to physical downlink control channel monitoring.

Brief Description of Prior Developments

It is known, in physical downlink control channel monitoring, to discontinuously monitor for downlink communications for power saving purposes.

SUMMARY

The following summary is merely intended to be exemplary. The summary is not intended to limit the scope of the claims.

In accordance with one aspect, an apparatus comprising: at least one processor; and at least one non-transitory memory including computer program code; the at least one memory and the computer program code configured to, with the at least one processor, cause the apparatus at least to: receive a configuration for physical downlink control channel monitoring; transmit, to a base station, a data transmission; select a physical downlink control channel monitoring pattern based, at least, on the configuration and information of the data transmission; and perform, with/at a user equipment, physical downlink control channel monitoring based on the selected physical downlink control channel monitoring pattern.

In accordance with one aspect, a method comprising: receiving a configuration for physical downlink control channel monitoring; transmitting, to a base station, a data transmission; selecting a physical downlink control channel monitoring pattern based, at least, on the configuration and information of the data transmission; and performing, with/at a user equipment, physical downlink control channel monitoring based on the selected physical downlink control channel monitoring pattern.

In accordance with one aspect, an apparatus comprising means for performing: receiving a configuration for physical downlink control channel monitoring; transmitting, to a base station, a data transmission; selecting a physical downlink control channel monitoring pattern based, at least, on the configuration and information of the data transmission; and performing physical downlink control channel monitoring based on the selected physical downlink control channel monitoring pattern.

In accordance with one aspect, a non-transitory computer-readable medium comprising program instructions stored thereon which, when executed with at least one processor, cause the at least one processor to: receive a configuration for physical downlink control channel monitoring; transmit, to a base station, a data transmission; select a physical downlink control channel monitoring pattern based, at least, on the configuration and information of the data transmission; and perform, with/at a user equipment, physical downlink control channel monitoring based on the selected physical downlink control channel monitoring pattern.

In accordance with one aspect, an apparatus comprising: at least one processor; and at least one non-transitory memory including computer program code; the at least one memory and the computer program code configured to, with the at least one processor, cause the apparatus at least to perform: transmit, to a user equipment, a configuration for physical downlink control channel monitoring; receive, from the user equipment, a data transmission; select a physical downlink control channel monitoring pattern based, at least, on the configuration and at least one of: information of the data transmission, or a physical random access channel preamble received from the user equipment; and transmit, to the user equipment, a transmission based on the selected physical downlink control channel monitoring pattern.

In accordance with one aspect, a method comprising: transmitting, to a user equipment, a configuration for physical downlink control channel monitoring; receiving, from the user equipment, a data transmission; selecting a physical downlink control channel monitoring pattern based, at least, on the configuration and at least one of: information of the data transmission, or a physical random access channel preamble received from the user equipment; and transmitting, to the user equipment, a transmission based on the selected physical downlink control channel monitoring pattern.

In accordance with one aspect, an apparatus comprising means for performing; transmitting, to a user equipment, a configuration for physical downlink control channel monitoring; receiving, from the user equipment, a data transmission; selecting a physical downlink control channel monitoring pattern based, at least, on the configuration and at least one of: information of the data transmission, or a physical random access channel preamble received from the user equipment; and transmitting, to the user equipment, a transmission based on the selected physical downlink control channel monitoring pattern.

In accordance with one aspect, a non-transitory computer-readable medium comprising program instructions stored thereon which, when executed with at least one processor, cause the at least one processor to: transmit, to a user equipment, a configuration for physical downlink control channel monitoring; receive, from the user equipment, a data transmission; select a physical downlink control channel monitoring pattern based, at least, on the configuration and at least one of: information of the data transmission, or a physical random access channel preamble received from the user equipment; and transmit, to the user equipment, a transmission based on the selected physical downlink control channel monitoring pattern.

BRIEF DESCRIPTION OF THE DRAWINGS

The foregoing aspects and other features are explained in the following description, taken in connection with the accompanying drawings, wherein:

FIG. 3 is a diagram illustrating features as described herein;

FIG. 6 is a flowchart illustrating steps as described herein; and

FIG. 7 is a flowchart illustrating steps as described herein.

DETAILED DESCRIPTION OF EMBODIMENTS

Figure 1:
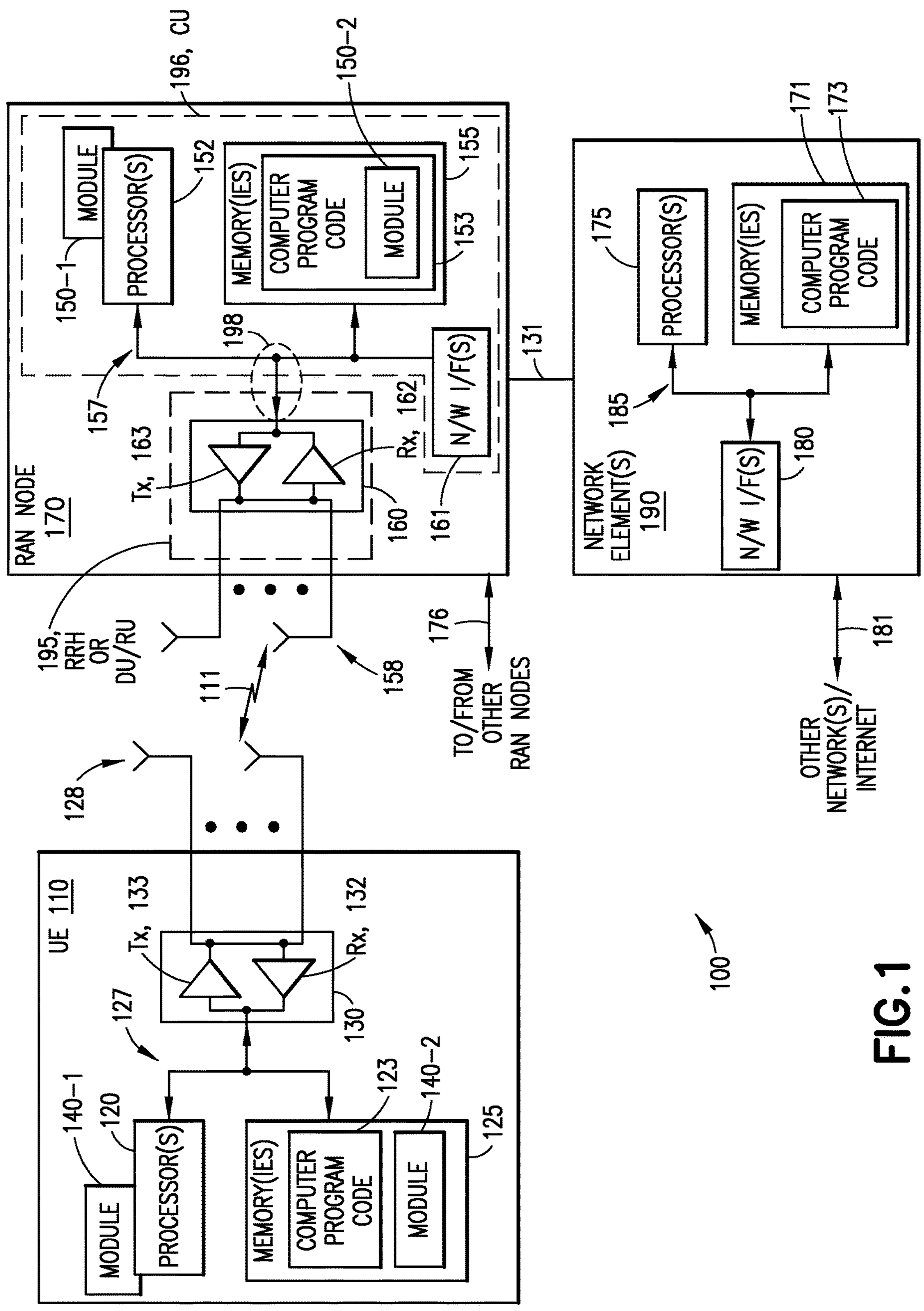
FIG. 1 is a block diagram of one possible and non-limiting exemplary system in which the exemplary embodiments may be practiced.

The following abbreviations that may be found in the specification and/or the drawing figures are defined as follows:

3GPP third generation partnership project
5G fifth generation
5GC 5G core network
ACK acknowledgement
AMF access and mobility management function
AS access stratum
BSR buffer status report
CG configured grant
CORESET control resource set
CS-RNTI configured scheduling radio network temporary identifier
CU central unit
CU-CP centralized unit-control plane
DCI downlink control information
DRB data radio bearer
DRX discontinuous reception
DU distributed unit
EDT early data transmission
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FR1 frequency range 1
FR2 frequency range 2
gNB (or gNodeB) base station for 5G/NR, i.e., a node providing NR user plane and control plane protocol terminations towards the UE, and connected via the NG interface to the 5GC
HO handover
I/F interface
I-RNTI inactive radio network temporary identifier
IE information element
L1 layer 1
LCG logical channel group
LCH logical channel
LTE long term evolution
MAC medium access control
MAC-I message authentication code-integrity
MAC-CE medium access control-control element
MME mobility management entity
ng or NG new generation
ng-eNB or NG-eNB new generation eNB
NR new radio
N/W or NW network
PCG pre-configured grant
PDCP packet data convergence protocol
PDU protocol data unit
PHR power headroom report
PHY physical layer
PRACH physical random access channel
PRB physical resource block
PSS primary synchronization signal
PUR periodic uplink resources
PUSCH physical uplink shared channel
RA random access
RA-CSS random access common search space
RACH random access channel
RAN radio access network
RF radio frequency
RLC radio link control
RNA RAN notification area
RNTI radio network temporary identifier
RO RACH occasion
RRC radio resource control
RRH remote radio head
RS reference signal
RSRP reference signal received power
RSRQ reference signal received quality
RU radio unit
Rx receiver
SDAP service data adaptation protocol
SDT small data transfer
SGW serving gateway
SI system information
SIB system information block
SMF session management function
SRB signaling radio bearer
SS search space
SSB synchronization signal block
SSS secondary synchronization signal
TA timing advance
TAT timing advance timer
Tx transmitter
UE user equipment (e.g., a wireless, typically mobile device)
UPF user plane function Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the gNB (or en-gNB or future base station) that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB (or en-gNB or future base station), and its operation is partly controlled by gNB-CU. One gNB-CU supports one or multiple gNB-DUs, each of which supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an SI interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Features as described herein generally relate to enhancing performance of Small Data Transmission (SDT) by UEs in the RRC_INACTIVE state of 5G NR. Example embodiments of the present disclosure may enable performance of SDT in a more power efficient manner. A small data transmission may include an initial UL SDT transmission, and/or any subsequent UL transmission that is part of a small data transmission procedure. In other words, example embodiments of the present disclosure may be triggered by either the initial UL transmission or any subsequent UL transmission.

Currently, small and infrequent data transfers that are needed by a UE that is in the RRC_INACTIVE state entail an RRC connection resume to switch the UE to the RRC_CONNECTED state, where the small data can be transferred. A subsequent suspension of the connection back to the RRC_INACTIVE state will likely occur immediately after the data transfer. This may happen for each and every data transmission, resulting in unnecessary UE power consumption and signaling overhead, as well as increased packet latency. However, the NR system includes requirements to be efficient and flexible for low throughput short data bursts (TS 22.891), to support efficient signaling mechanisms (e.g. signaling is less than payload), and to reduce the signaling overhead in general.

In 3GPP Rel. 17, there is an ongoing Work Item (WI) entitled "NR small data transmissions in INACTIVE state" [RP-201305] to address the inefficiencies explained above (i.e. signaling overhead and delay associated with state transition from RRC_INACTIVE to RRC_CONNECTED to perform a short data transmission). The small data transmission (SDT) functionality is important to the WI, since the motivation to introduce the RRC_INACTIVE state itself in NR was to be able to transition UEs with infrequent data transmission to a state with minimum signaling overhead and minimum power consumption. According to objectives stated in the WI, three SDT types are being defined: 4-step RA-SDT, 2-step RA-SDT, and CG-SDT.

In RA-SDT, a UE in RRC_INACTIVE state can transmit UL data as part of the random access (RA) procedure. In 4-step RA-SDT, the Msg3 (dynamic scheduled PUSCH resources in Msg2) of the 4-step random access procedure is used to transmit the SDT payload. In 2-step RA-SDT, the MsgA (pre-configured PUSCH resources) of the 2-step random access procedure is used to transmit the SDT payload. Certain conditions may be defined for the UE to check before being allowed to use a RA-SDT type, which may include some or all of the following potential conditions: the payload should belong to a DRB/SRB allowed for SDT; the data volume should be below a defined data volume threshold; the (cell) RSRP should be above a threshold; and/or a legacy RSRP-based condition may apply/be used to select between 2-step and 4-step RACH SDT. In other words, if the UE determines that one or more of these conditions are not met, the UE may not be allowed to use/perform RA-SDT. If defined conditions are determined to be met, the UE may be allowed to use/perform RA-SDT.

In NR, it is possible to configure uplink transmissions without the need to transmit a dynamic grant in correspondence of each UL transmission occasion. The configuration of these uplink resources is also referred to as Configure Grant (CG) PUSCH resources. In CG-SDT, a UE in RRC_INACTIVE state can transmit UL data on pre-configured PUSCH resources (i.e. Configured Grant (CG) type 1 based PUSCH resources), without a random access procedure, whenever UE has a valid timing advance (TA) and other conditions are met. The validation conditions for CG-SDT may comprise some or all of the following TA validity conditions: before using a CG-SDT resource, the UE has to ensure that its last received TA is valid by checking e.g. that the TA timer (TAT) is running, if TAT was received, and that the defined TA validity condition(s) are also valid. The TA validity condition(s) will likely be based on an RSRP variation to be compared to RSRP variation threshold(s), similarly to the LTE Preconfigured UL Resources (PUR) based EDT (Early Data Transmission). Besides the TA validity condition(s) above, further conditions may be defined to be checked before the UE is allowed to use the assigned CG resources, e.g. a combination of some or all of the following further conditions: the payload should belong to a DRB/SRB allowed for SDT; the data volume should be below a defined data volume threshold; UE should be in the last serving cell that assigned the resources; the CG resources should be valid; and/or the SS-RSRP of the beam selected for the SDT transmission via a CG based PUSCH resource should be above a defined RSRP threshold. In case any of the validation conditions above is not fulfilled, CG-SDT cannot be used and the UE can fall back, e.g. to use RA-SDT (i.e. 4-step RA-SDT or 2-step RA-SDT, according to the specifications/configuration and/or validity/selection conditions defined for those RA-SDT types) or legacy resume. If defined conditions are determined to be met, the UE may be allowed to use/perform CG-SDT.

Figure 2:
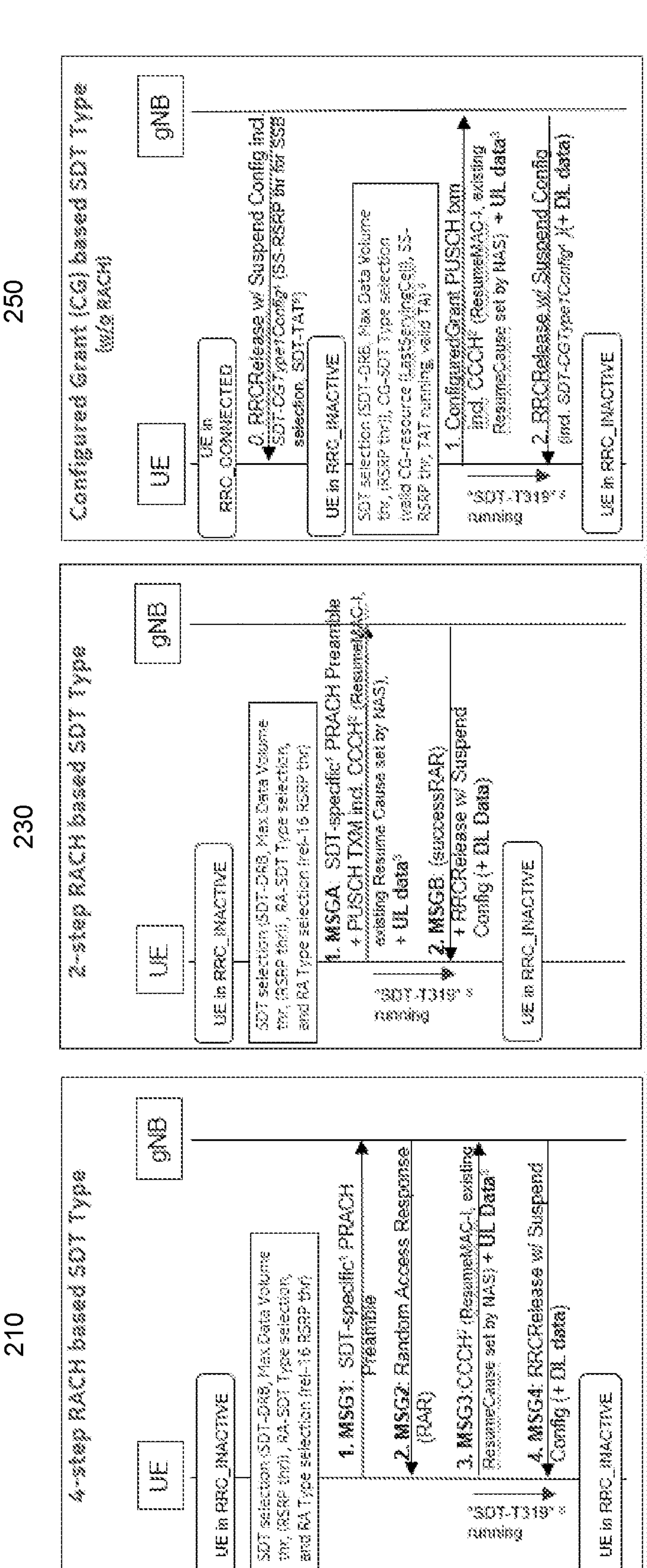
FIG. 2 is a diagram illustrating features as described herein.

Referring now to FIG. 2, illustrated are examples of 4-step RA-SDT (210), 2-step RA-SDT (230), and CG-SDT (250) in the scope of 3GPP Rel-17 for the single-shot SDT case, i.e. an SDT procedure that includes only one UL data and, in addition, only one DL data (optionally).

In 4-step RA-SDT (210), a UE in an RRC_INACTIVE state may determine to perform SDT. The UE may transmit a MSG1 to the gNB comprising an SDT-specific PRACH preamble. The gNB may transmit a MSG2 comprising a random access response (RAR). The UE may transmit a MSG3 comprising CCCH (e.g. an RRC message comprising the ResumeMAC-I for UE verification, an existing ResumeCause that may be set by NAS, and/or the UE identifier, I-RNTI) and UL data. An initial SDT transmission may be sent in MSG3. The gNB may transmit MSG4, which may comprise a RRCRelease message with a Suspend Configuration and, optionally, DL data. MSGs 1-4 may constitute part of the SDT procedure. After MSG4 ends the SDT procedure, the UE may then be in an RRC_INACTIVE state and omit SDT operations such as PDCCH monitoring that may be necessary during the SDT procedure.

In 2-step RA-SDT (230), a UE in an RRC_INACTIVE state may determine to perform SDT. The UE may transmit a MSGA comprising an SDT-specific PRACH preamble and PUSCH TXM including CCCH (e.g. an RRC message comprising the ResumeMAC-I for UE verification, an existing ResumeCause that may be set by NAS, and/or the UE identifier, I-RNTI) and UL data. An initial SDT transmission may be sent in MSGA. The gNB may transmit MSGB, which may comprise successRAR and a RRCRelease message with a Suspend Configuration and, optionally, DL data. MSGA and MSGB may constitute part of the SDT procedure. After MSGB ends the SDT procedure, the UE may then be in RRC_INACTIVE state and omit SDT operations such as PDCCH monitoring that may be necessary during the SDT procedure.

In CG-SDT (250), a UE in an RRC_CONNECTED state may receive from a gNB an RRCRelease message with a Suspend Configuration, including a UE-specific configuration for SDT. Such configuration, denoted SDT-CGType1Config in FIG. 2, may include PUSCH and DMRS resources (e.g. PUSCH transmission occasions and allowed SSBs) that may be used for SDT, and may include additional parameters related to the CG-SDT validity conditions (e.g. SS-RSRP threshold for SSB selection, and SDT-TAT). The UE then moves to the RRC_INACTIVE state based on the received RRC message. The UE may determine to perform SDT. The UE may transmit to the gNB a Configured Grant-based PUSCH transmission, which may include CCCH (e.g. including similar information as in 210/230) and UL data. The gNB may transmit an RRCRelease message with a Suspend Configuration, including SDT-CGType1Config, and, optionally, DL data. The Configured Grant based PUSCH transmission and RRCRelease transmission may constitute part of SDT. After the RRCRelease message, the UE may then be in RRC_INACTIVE state and omit SDT operations such as PDCCH monitoring that may be necessary during the SDT procedure.

While FIG. 2 illustrates examples of single-shot SDT, it has been agreed to support also "multi-shot" SDT, i.e. an SDT procedure that includes multiple subsequent UL/DL SDT transmissions (without transitioning to RRC_CONNECTED). In multi-shot SDT, the one or more subsequent UL/DL transmissions will be carried between the initial UL SDT transmission and the RRCRelease message that ends the SDT procedure. Example embodiments of the present disclosure may relate to single-shot SDT and/or multi-shot SDT.

Specific examples of small and infrequent data traffic include, but are not limited to, the following smartphone application use cases and non-smartphone application use cases: traffic from Instant Messaging services (whatsapp, QQ, wechat etc.); heart-beat/keep-alive traffic from IM/email clients and other apps; push notifications from various applications; traffic from wearables (periodic positioning information, etc.); sensors (Industrial Wireless Sensor Networks transmitting temperature, pressure readings, etc. periodically or in an event triggered manner, etc.); smart meters and smart meter networks sending periodic meter readings; etc. These and other use cases might benefit from a SDT procedure according to an example embodiment of the present disclosure.

As part of the REL17 WI on UE Power Saving Enhancements for NR (RP-200938), the following two key schemes are being discussed for PDCCH monitoring reduction during DRX Active Time: DCI-based PDCCH monitoring skipping indication, and DCI (and/or timer) based Search Space (SS) Set group switching (SS group switching or SSSS). In the DCI-based PDCCH monitoring skipping indication scheme, the gNB can decrease the PDCCH monitoring of the UE by sending a DCI that indicates to the UE that the UE is allowed to skip monitoring for a certain consecutive number of slots/OFDM symbols after the DCI is received. In the DCI based SS Set group switching scheme, the gNB may adapt the UE's PDCCH monitoring behavior by switching the UE (via DCI) to use one of the SS groups among the configured groups in order to either reduce the UE PDCCH monitoring or to increase it (e.g. typically, each SS set group has different monitoring periodicities).

Referring now to FIG. 3, illustrated is an example of monitoring patterns of two SS groups in R16. In the example, monitoring can be configured on two cells for a UE (PCell and SCell), according to two different SS groups (SS group #0 and #1). Each SS group is associated to a different monitoring pattern(s) on the cells. For example, SS group #0 is configured with a much sparser monitoring of both PCell (monitoring every 10 slots) and SCell (no monitoring). The latter means that the UE is allowed to not monitor PDCCH on the SCell if SS group #0 is active. Vice-versa, SS group #1 is configured with a much more frequent monitoring of both PCell and SCell (monitoring every slot).

Features as described herein generally relate to the small data transmission (SDT) procedure in RRC_INACTIVE state of 5G NR, however these procedures may also be applicable to SDT procedures in the RRC_IDLE state of 5G NR (or LTE) or in another RRC state of 5G NR/future radio interface that may be introduced in future releases/technologies. During a SDT procedure, after the UE in RRC_INACTIVE state performs a first UL SDT transmission, the UE may perform continuous PDCCH monitoring in the Random Access Common Search Space (RA-CSS), i.e. type 1 PDCCH Common Search Space. This monitoring may be necessary because the UE may receive any of the following: a potential downlink ACKnowledgment for the UL payload that the UE has sent (this could be, for example, a L1 ACK and/or an application layer ACK); a potential UL/DL scheduling grant for subsequent UL/DL data transmissions as part of the same SDT procedure, without transition to the RRC connected mode (e.g. multi-shot SDT); and/or the RRC Release message that should end the ongoing SDT procedure.

The delay in receiving the RRC Release message (e.g. terminating an ongoing SDT procedure) may depend, for example, on the network decision to wait to collect one or more DL messages during an ongoing SDT procedure, in order to avoid the need for paging the UE shortly after the SDT procedure is terminated (i.e. in/during a time period close/soon after the SDT procedure has been completed). The rationale for the network to wait for DL data is that the signaling cost for paging is high (i.e. paging is to be done in a beam-swept manner in 5G NR), and also that the paging (that notifies the UE that there is, e.g., a pending DL transmission) would trigger the UE to transition to RRC_CONNECTED mode/state to receive the DL data, which would consume UE power and radio resources. Accordingly, delaying the RRC Release message so that paging may be avoided may result in reduced signaling and power consumption.

Similarly, the delay in receiving application-level DL data (e.g. an application response to the UL data sent by the UE) depends e.g. on the service, deployment, and the total latency involved in the interface and processing between the UE/RAN and data server.

Continuous PDCCH monitoring consumes UE power, and may be considered incompatible with the RRC_INACTIVE state, which is designed as a power efficient state. It may be noted that, because the RA-CSS is used by all UEs in RRC_IDLE and RRC_INACTIVE states, its load is typically high, and therefore its periodicity is likely to be configured to the minimum value (i.e. 1 slot) to maximize the PDCCH capacity. Assuming a RA-CSS with 1 slot monitoring period, this results in the fact that UEs in RRC_IDLE/INACTIVE states should be monitoring the RA-CSS every single slot after initiating the Random Access including during SDT. This may be power intensive, given that an SDT procedure can last a few seconds. It is noted that the maximum value of the T319 timer that UE has to start after sending an RRC Resume Request in MSG3/MSGA of a random access is 2 seconds, currently.

Therefore, to alleviate the UE power consumption during SDT, it has been agreed that an SDT specific Search Space (SDT-SS) can be configured after contention resolution to UEs that triggered a RA-SDT procedure.

A PDCCH search space may determine when in time the UE should try to detect PDCCH and may comprise time domain parameters for the monitoring (e.g. a monitoring periodicity) and a specific set of candidate physical resources that UE has to monitor to find scheduling information (e.g. scheduling grants/DCI).

Thus, the UE has to monitor the RA-CSS during SDT before receiving the UE contention resolution identity, i.e. until the UE can confirm based on the corresponding MAC CE received from the network that the UE identity was uniquely identified by the network (out of the multiple devices/UEs that may have performed simultaneous random-access attempts using the same preamble sequence as the given UE). After the random access is successfully completed and UE contention resolution identity is obtained by the UE, the UE can use a separated SDT-SS which could be configured with a larger monitoring period compared to the RA-CSS (e.g. using a 2, 4, or 8 slots period) to alleviate the UE power consumption during the rest of the SDT procedure. It may be noted that if the network does not provide a SDT specific CORESET/SS, the UE will still have to monitor the type-1 PDCCH CSS (RA-CSS).

It is feasible to use either a new common search space or a UE-specific search space for SDT. A UE-specific SS (SDT-USS) would entail the highest flexibility, as it can account for the UE needs, at the cost of larger signaling (dedicated RRC signaling may be required) and introduces challenges to fetch the UE's USS when the UE initiates the SDT procedure in a different cell than the last serving cell that configured the UE with the USS.

In contrast, a common SS (SDT-CSS) would entail lower signaling overhead (leveraging SIB signaling), but at the cost of lower flexibility, since all UEs served by the cell would have to apply the same SDT-CSS during SDT.

The SDT-CSS option has limitations in terms of the power saving gain achievable by the UEs. The issue is that it might not be possible to differentiate various SDT scenarios that would benefit from a different configuration of the search space (e.g. of the monitoring period) in order to maximize the obtained UE power saving. For example, for SDT procedures initiated during a period (of hundreds of ms or a few seconds) in which the cell is observing a low vs high network load, it may be cumbersome to reconfigure the SDT-CSS in the SIB with such a high frequency. In another example, it might not be possible to differentiate between SDT procedures that require UE context fetch (for which the gNB to which the cell belongs would need to fetch the UE context from the UE's anchor gNB) vs. the ones that do not require it.

Example embodiments of the present disclosure may provide the technical effect of achieving further PDCCH monitoring reduction in these different SDT scenarios by adapting among multiple SDT-CSSs dedicated for SDT and/or multiple Search Spaces groups and/or multiple monitoring skipping configurations (e.g. Rel-17 schemes for PDCCH monitoring reduction, described above). Example embodiments of the present disclosure may provide the technical effect of obtaining larger UE power saving gains as compared to the use of using a single SDT-CSS for all UEs served by a cell.

Example embodiments of the present disclosure may involve a UE-based adaptation of the PDCCH monitoring pattern to be used during an SDT procedure, in which the UE may select one PDCCH monitoring pattern (e.g. a Search Space or a Search Space set or a Search Space group dedicated to SDT) among the configured ones based on defined adaptation triggers, i.e. without requiring the network to explicitly indicate the PDCCH pattern switch to the UE. The adaptation triggers (rules/conditions) may be configured and/or pre-defined in specification(s), and may be based on the content of the UL SDT transmission (e.g. whether or not BSR is included in the Msg3/MsgA of RA-SDT, or in the CG-based PUSCH transmission of a CG-SDT) and/or based on the usage of certain random access resources (e.g. PRACH preamble dedicated to SDT).

It may be noted that, whenever the proposed switch of the PDCCH monitoring pattern is based on the content of the first UL SDT transmission (or usage of certain random access resource), the switch may be made after contention resolution is resolved; this may allow the UE and serving cell to always be in synchronization with respect to the PDCCH monitoring pattern used at any given time. It may be assumed that the network will send the contention resolution MAC CE only if it was able to decode correctly the MAC PDU (carried in the first UL SDT transmission), which may imply that the network is aware of the content of such transmission. In other words, if the network was not able to correctly decode the MAC PDU, the contention resolution MAC CE is not sent, and the PDCCH monitoring may not proceed according to an example embodiment of the present disclosure (e.g. adaptation of the PDCCH monitoring pattern based on a defined trigger).

Accordingly, the network may be aware of the PDCCH monitoring pattern that the UE switches to after contention resolution, and it may account for such PDCCH monitoring pattern when sending PDCCH messages to the UE.

In an example embodiment, the PDCCH monitoring patterns may be configured to the UE via SIB and/or dedicated RRC signaling (e.g. using the RRC Release message) and the configuration of these PDCCH monitoring patterns may indicate, implicitly or explicitly, an association with a certain adaptation trigger (which may trigger the switch to a given PDCCH monitoring pattern). The configured pattern(s) may comprise one or more sets of Search Spaces dedicated to SDT, or one or more groups of Search Spaces dedicated to SDT, where each group may include one set of Search Space.

In an example embodiment, one adaptation trigger may relate to/be the presence of the BSR and/or the BSR index that the UE may send in the UL SDT transmission. For example, upon receiving the UE Contention Resolution Identity MAC CE in response to the first UL SDT message (e.g. RA Msg3/MsgA), the UE may select the PDCCH monitoring pattern that is associated with the trigger "BSR present", if the UE included the BSR in the first UL SDT message. Additionally or alternatively, the UE may select the PDCCH monitoring pattern that is associated with the trigger "buffer size>threshold", if the UE included the BSR in the first UL SDT message having a value above a defined threshold, i.e., the available data in the UE buffer is above a threshold level after the Msg3/MsgA transmission. Additionally or alternatively, the UE may select the PDCCH monitoring pattern based on a buffer size of certain LCG(s). For example, in case the amount of data in the buffer of a LCG is above a threshold level, or in case the buffer status index (BS_index) indicated in the BSR for a LCG is above a threshold index, or in case the amount of data in the buffers of a configured LCG is above a threshold level, the UE may select a PDCCH monitoring pattern. The UE may also be configured with PDCCH monitoring pattern(s) that are respectively associated with a BSR not being present in the first UL SDT message, a UE buffer size being less than or equal to a threshold value, an amount of data in the buffer of a LCG is equal to or below a threshold level, BS_index is below a threshold data, or an amount of data in the buffers of a configured LCG is below a threshold value.

In an example embodiment, a PDCCH monitoring pattern may be associated with one or more triggers. Triggers may be prioritized such that, if a first trigger condition is met, a PDCCH monitoring pattern may be selected even if a second trigger condition, associated with another PDCCH monitoring pattern, would also be met if evaluated. In other words, the first trigger condition may be sufficient for selecting a PDCCH monitoring pattern. If the first trigger condition is not met, the second trigger condition may be evaluated, etc.

In an example embodiment, a Search Space with less relaxed monitoring (e.g. multiple slots monitored) may be used in case the BSR is present and/or a larger buffer in the BSR is present in the (first) UL SDT message. In these cases, the UE may expect one or more UL scheduling grants to be received in the PDCCH to perform the subsequent UL transmission(s) and carry the buffered data.

In an example embodiment, the configuration of LCG(s) to consider may be/include the ones that include LCHs with priority above a threshold level, or LCHs with a certain/defined priority. In an example embodiment, only LCHs allowed for SDT may be considered. In an example embodiment, the NW may configure the LCG(s) considered for the calculation.

In an example embodiment, the UE may apply the SDT-SS with the largest monitoring periodicity out of the configured ones/sets/groups, in case it transmits all the pending UL data in the first SDT message and includes a BSR indicating empty buffer. In an alternative example embodiment, the UE may apply the SDT-SS with the shortest monitoring periodicity out of the configured ones/sets/groups, in case it has more than a threshold amount of SDT data after the initial SDT transmission, and/or it indicates more than a threshold amount of SDT data in a BSR transmitted to the NW.

In an example embodiment, the UE may apply the SDT-SS with the shortest/largest periodicity by default or initially, upon the SDT procedure initiation if an SDT specific preamble was used, e.g. based on the configuration. It may be noted that the detection of a SDT preamble may allow the network to know which SS the UE is using, even in a case in which Msg3/MsgA were not successfully decoded.

In an example embodiment, the UE may always apply the SDT-SS with the shortest/longest periodicity when it initiates SDT in the same cell where it was previously served.

In an example embodiment, a PDCCH monitoring pattern may include a back-off timer. For example, an SDT-SS may be applied after the back-off timer expires; while the timer is running, the UE may skip PDCCH monitoring (e.g. to account for gNB processing delay and/or UE context fetch delay (for SDTs that require UE context fetch)).

In an example embodiment, the UE may apply a PDCCH monitoring pattern based on the RSRP/RSRQ information sent together with the initial SDT transmission (i.e. MSG3 or MSGA). In other words, different RSRP/RSRQ values may be mapped to different PDCCH monitoring patterns. In an alternative example embodiment, the UE may apply the SDT-SS with the shortest or longest monitoring periodicity in case it has reported a RSRP and/or RSRQ that is less and/or more than a threshold amount.

In an example embodiment, the UE may apply a PDCCH monitoring pattern based on the PHR sent together with initial SDT transmission (i.e. MSG3 or MSGA). In other words, different PHR values may be mapped to different PDCCH monitoring patterns. In one alternative example, the UE may apply the SDT-SS with the shortest or longest monitoring periodicity in case it has reported a PHR that is less or more (respectively) than a threshold amount.

In an example embodiment, the UE may apply a PDCCH monitoring pattern based on which SDT SRB/DRB data is available for transmission. In other words, different SRBs/DRBs may be mapped to different PDCCH monitoring patterns.

In an example embodiment, the UE may apply a PDCCH monitoring pattern based on which random access resources are currently used for SDT. In other words, different random access resources may be mapped to different PDCCH monitoring patterns. As the used random access resource (PRACH preamble) may depend on the selected/strongest DL reference signal (i.e. SSB), the PDCCH monitoring pattern selection may enable the UE to accommodate the gNB spatial TX beam pattern/sweep.

In an example embodiment, the UE may indicate, in the initial SDT transmission (MSG3 or MSGA), which PDCCH monitoring pattern it prefers to use after contention resolution. The NW may then allow use of the indicated/preferred/selected PDCCH monitoring pattern, or not.

It may be noted that this solution may apply to both RA-SDT and CG-SDT. For CG-SDT, the PDCCH monitoring pattern may be UE-specific, or may be specific to a CG-SDT configuration and/or to a CG-SDT PUSCH resource (e.g. transmission occasion).

Figure 4:
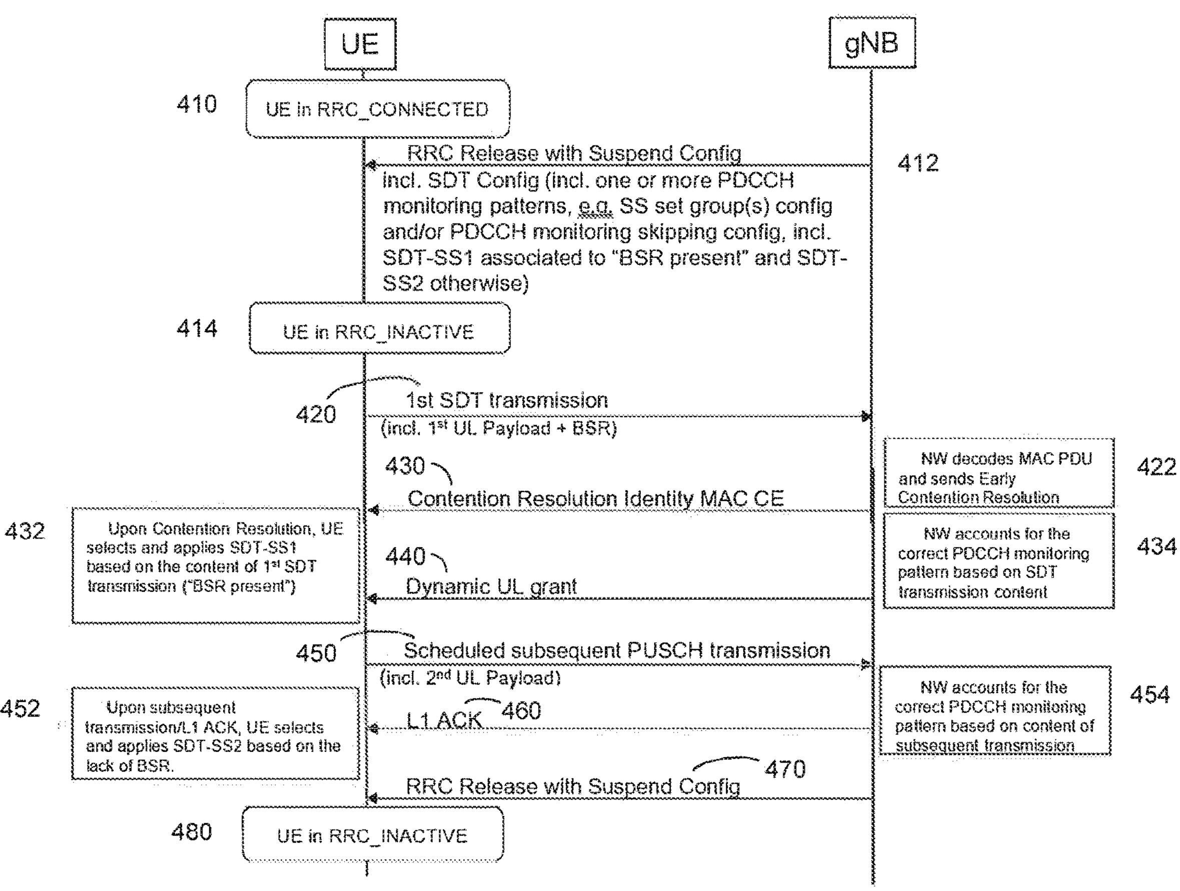
FIG. 4 is a diagram illustrating features as described herein.

Referring now to FIG. 4, illustrated is an example in which a UE initiates a two-shot SDT procedure (with subsequent UL data) in the last serving cell, according to one or more example embodiments of the present disclosure. At 410, the UE is in an RRC_CONNECTED state. At 412, the (serving) gNB transmits to the UE an RRC Release message with a Suspend Configuration. This may include an SDT configuration, which may include one or more PDCCH monitoring patterns. For example, the PDCCH monitoring pattern(s) may comprise an indication of SS set group(s) configuration and/or PDCCH monitoring skipping configuration(s), including SDT-SS1 associated with "BSR present," or SDT-SS2 otherwise. At 414, the UE may be in an RRC_INACTIVE state, due to the received RRC release message. While in an RRC_INACTIVE state, the UE may determine to perform SDT transmission. At 420, the UE may transmit a first SDT transmission to the gNB. The SDT transmission may include a first uplink payload and may include an indication of BSR. This information may be included in a MAC PDU. At 422, the NW may decode the MAC PDU and may determine to send Early Contention Resolution. At 430, the gNB may transmit to the UE a contention resolution identity MAC CE. At 432, upon contention resolution, the UE may select and apply, for example, SDT-SS1 based on the content of the 1st SDT transmission, 420, in which BSR was present. In other words, the UE may select a PDCCH monitoring pattern based on the condition "BSR present" being true in the example of FIG. 4. At 434, the NW may account for the correct PDCCH monitoring pattern (in this example, SDT-SS1) based on SDT transmission content, i.e. 420. At 440, the gNB may transmit a dynamic UL grant to the UE. The transmission of the UL grant may be performed according to the determined PDCCH monitoring pattern selected by the UE. The UE may receive this UL grant based on the monitoring according to the selected PDCCH monitoring pattern (in this example, SDT-SS1).

At 450, the UE may transmit a scheduled subsequent PUSCH transmission to the gNB. This (SDT) PUSCH transmission may include a 2nd UL payload. At 452, upon subsequent transmission/L1 Ack, the UE may select and apply SDT-SS2 based on the lack of BSR in 450. In other words, the UE may select a (different) PDCCH monitoring pattern based on the fact/determination that 450 does not include BSR, i.e. SDT-SS2. At 454, the NW may account for the correct PDCCH monitoring pattern, selected by the UE (in this example, SDT-SS2), based on the content of the subsequent transmission, 450. At 460, the gNB may transmit L1 ACK based on the determined/correct PDCCH monitoring pattern being used by the UE. The UE may receive the L1 ACK based on the selected PDCCH monitoring pattern (i.e. SDT-SS2). At 470, the gNB may transmit a RRC Release message with a Suspend Configuration. Accordingly, at 480, the UE may be in an RRC_INACTIVE state.

Figure 5:
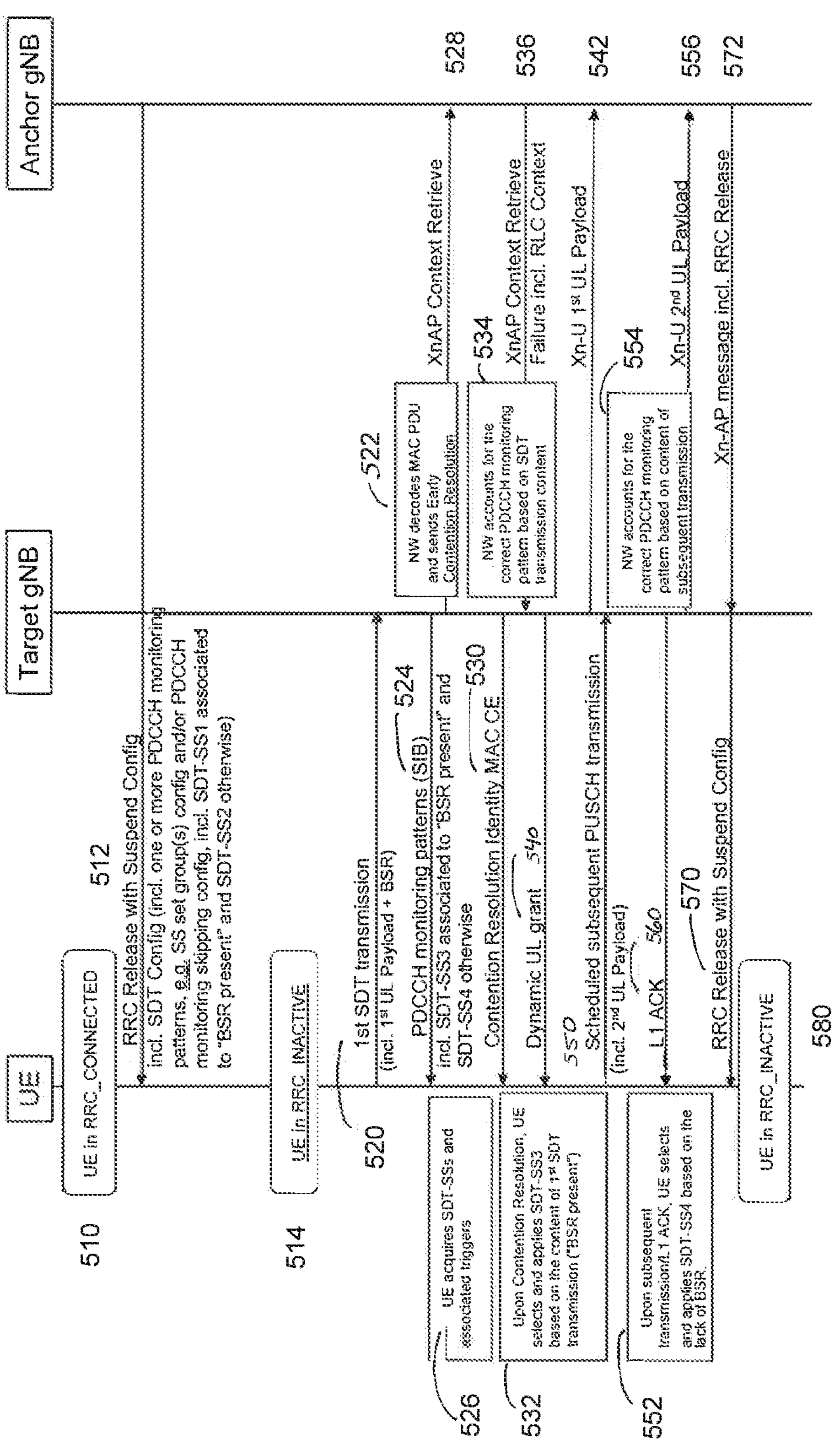
FIG. 5 is a diagram illustrating features as described herein.

Referring now to FIG. 5, illustrated is an example in which a UE initiates a single-shot SDT in a target cell (different than the last serving cell) in the UE's RAN Notification Area (RNA). At 510, the UE may be in an RRC_CONNECTED state. At 512, the anchor gNB (i.e. a previously serving gNB) may transmit a RRC Release message with a Suspend Configuration. This may include an SDT configuration, which may include one or more PDCCH monitoring patterns. For example, the PDCCH monitoring pattern(s) may comprise an indication of SS set group(s) configuration and/or PDCCH monitoring skipping configuration(s), including, for example, SDT-SS1 associated with "BSR present" and SDT-SS2 otherwise. At 514, the UE may be in an RRC_INACTIVE state, due to the received RRC release message. While in RRC_INACTIVE state, the UE may determine to perform SDT transmission. At 520, the UE may transmit to a target gNB a first SDT transmission, which may include a first UL payload and BSR. This information may be included in a MAC PDU. At 522, the NW may decode the MAC PDU and may determine to send Early Contention Resolution. At 524, the target gNB may transmit (additional) PDCCH monitoring patterns to the UE as a SIB. The SIB may include, for example, SDT-SS3 associated to "BSR present" and SDT-SS4 otherwise. At 526, the UE may acquire SDT-SSs and associated triggers. At 528, the target gNB may transmit to the anchor gNB XnAP Context Retrieve message/request. At 530, the target gNB may transmit to the UE a contention resolution identity MAC CE. Based on the contention resolution, the UE may select and apply SDT-SS3, based on the content of the first SDT transmission, 520, in which BSR was present. At 534, the NW may account for the correct PDCCH monitoring pattern based on SDT transmission content (in this example, SDT-SS3). At 536, the anchor gNB may transmit to the target gNB an XnAP Context Retrieve Failure, including RLC context. At 540, the target gNB may transmit to the UE a dynamic UL grant. The UE may receive this UL grant based on the SDT-SS3 PDCCH monitoring pattern. The target gNB may transmit this UL grant based on the SDT-SS3 PDCCH monitoring pattern. At 542, the target gNB may transmit to the anchor gNB a Xn-U first UL payload.

At 550, the UE may transmit to the target gNB a scheduled subsequent (SDT) PUSCH transmission, which may include a second (SDT) UL payload. This UL payload may be transmitted based on the dynamic UL grant, 540. At 552, upon subsequent transmission/L1 ACK, the UE may select and apply SDT-SS4 based on the lack of BSR in the 2nd UL payload, 550. At 554, the network may account for the correct PDCCH monitoring pattern (in this example, SDT-SS4) based on content of the subsequent transmission, 550. At 556, the target gNB may transmit to the anchor gNB an Xn-U 2nd UL payload. At 570, the target gNB may transmit to the UE a RRC Release message with a Suspend Configuration. At 572, the anchor gNB may transmit to the target gNB an Xn-AP message including a RRC Release message. The RRC Release message transmitted to the UE, 570, may be based on the RRC Release message received by the target gNB, 572. At 580, the UE may be in RRC_INACTIVE state, based on the RRC Release message, 570.

It may be noted that, in FIGS. 4 and 5, the ordering of some of the transmissions may be slightly different, and/or some of the transmission may occur simultaneously or substantially simultaneously.

While in the examples of FIGS. 4 and 5 the condition for selection of a PDCCH monitoring pattern is whether BSR is present in an UL transmission, other or additional conditions for selection of a PDCCH monitoring pattern are possible; the examples of FIGS. 4 and 5 are not limiting.

FIG. 6 illustrates the potential steps of an example method 600. The example method 600 may include: receiving a configuration for physical downlink control channel monitoring, 610; transmitting, to a base station, a (small) data transmission, 620; selecting a physical downlink control channel monitoring pattern based, at least, on the configuration and information of the (small) data transmission, 630; and performing, with a user equipment, physical downlink control channel monitoring based on the selected physical downlink control channel monitoring pattern, 640. The (small) data transmission may comprise an initial UL SDT transmission and/or any subsequent UL transmission(s).

FIG. 7 illustrates the potential steps of an example method 700. The example method 900 may include: transmitting, to a user equipment, a configuration for physical downlink control channel monitoring, 710; receiving, from the user equipment, a (small) data transmission, 720; selecting a physical downlink control channel monitoring pattern based, at least, on the configuration and at least one of: information of the (small) data transmission, or a physical random access channel preamble received from the user equipment, 730; and transmitting, to the user equipment, a transmission based on the selected physical downlink control channel monitoring pattern, 740. In other words, the transmission may be transmitted, at 740, using time and/or frequency resources according to the selected physical downlink control channel monitoring pattern. For example, a scheduling downlink control information (DCI) may be transmitted, in time domain, during slots in which the UE is monitoring the PDCCH (i.e. according to a UE-selected PDCCH monitoring pattern).

A technical effect of example embodiments of the present disclosure may be to enable the UE to make use of the most suitable SS on a per-UE-needs basis, and thereby obtaining the highest UE power savings. A technical effect of example embodiments of the present disclosure may be that the network need not have dedicated signaling for accommodating UE-specific needs, and so keep the signaling overhead low.

In accordance with one example embodiment, an apparatus may comprise: at least one processor; and at least one memory including computer program code; the at least one memory and the computer program code configured to, with the at least one processor, cause the apparatus at least to: receive a configuration for physical downlink control channel monitoring; transmit, to a base station, a data transmission; select a physical downlink control channel monitoring pattern based, at least, on the configuration and information of the data transmission; and perform, with a user equipment, physical downlink control channel monitoring based on the selected physical downlink control channel monitoring pattern.

The example apparatus may be further configured to: receive a transmission while performing the physical downlink control channel monitoring, wherein the transmission may comprise one of: an acknowledgement of the data transmission, a scheduling grant for a subsequent transmission, or a radio resource control release message.

The configuration for physical downlink control channel monitoring may comprise an indication of at least one of: one or more small data transmission specific search spaces, one or more small data transmission specific search space groups, or one or more small data transmission specific physical downlink control channel monitoring skipping configuration(s), wherein the indication may be associated with at least one trigger, wherein selecting the physical downlink control channel monitoring pattern may be based on the at least one trigger.

The at least one trigger may comprise at least one of: whether the data transmission includes a buffer status report or a buffer status report index, a content of the data transmission, use of a physical random access channel preamble dedicated to small data transmission, reference signal received power information included with the data transmission, reference signal received quality information included with the data transmission, a power headroom report included with the data transmission, one or more random access resources used for the data transmission, a physical downlink control channel monitoring pattern indicated with the user equipment to a network, whether the base station previously served the user equipment, an amount of pending data for small data transmission, a type of the pending data for small data transmission, a size of a buffer of the data transmission, a size of a buffer of at least one predetermined logical channel group of the data transmission, or a signaling radio bearer or data radio bearer associated with the pending data for small data transmission.

The at least one predetermined logical channel group may comprise at least one of: at least one logical channel group with a priority above a threshold level, at least one logical channel group having at least one predetermined priority, at least one logical channel allowed for small data transmission, or at least one network configured logical channel group.

The configuration for physical downlink control channel monitoring may be received via one of: a system information block, dedicated radio resource control signaling, or a radio resource release message.

The selected physical downlink control channel monitoring pattern may include a back-off timer.

The data transmission may comprise at least one of: an initial transmission in a small data transfer procedure, or a subsequent transmission in the small data transfer procedure.

In accordance with one aspect, an example method may be provided comprising: receiving a configuration for physical downlink control channel monitoring; transmitting, to a base station, a data transmission; selecting a physical downlink control channel monitoring pattern based, at least, on the configuration and information of the data transmission; and performing, with a user equipment, physical downlink control channel monitoring based on the selected physical downlink control channel monitoring pattern.

The example method may further comprise: receiving a transmission while performing the physical downlink control channel monitoring, wherein the transmission may comprise one of: an acknowledgement of the data transmission, a scheduling grant for a subsequent transmission, or a radio resource control release message.

The configuration for physical downlink control channel monitoring may comprise an indication of at least one of: one or more small data transmission specific search spaces, one or more small data transmission specific search space groups, or one or more small data transmission specific physical downlink control channel monitoring skipping configuration(s), wherein the indication may be associated with at least one trigger, wherein the selecting of the physical downlink control channel monitoring pattern may be based on the at least one trigger.

The at least one trigger may comprise at least one of: whether the data transmission includes a buffer status report or a buffer status report index, a content of the data transmission, use of a physical random access channel preamble dedicated to small data transmission, reference signal received power information included with the data transmission, reference signal received quality information included with the data transmission, a power headroom report included with the data transmission, one or more random access resources used for the data transmission, a physical downlink control channel monitoring pattern indicated with the user equipment to a network, whether the base station previously served the user equipment, an amount of pending data for small data transmission, a type of the pending data for small data transmission, a size of a buffer of the data transmission, a size of a buffer of at least one predetermined logical channel group of the data transmission, or a signaling radio bearer or data radio bearer associated with the pending data for small data transmission.

The at least one predetermined logical channel group may comprise at least one of: at least one logical channel group with a priority above a threshold level, at least one logical channel group having at least one predetermined priority, at least one logical channel allowed for small data transmission, or at least one network configured logical channel group.

The configuration for physical downlink control channel monitoring may be received via one of: a system information block, dedicated radio resource control signaling, or a radio resource release message.

The selected physical downlink control channel monitoring pattern may include a back-off timer.

The data transmission may comprise at least one of: an initial transmission in a small data transfer procedure, or a subsequent transmission in the small data transfer procedure.

In accordance with one example embodiment, an apparatus may comprise: circuitry configured to perform: receive a configuration for physical downlink control channel monitoring; transmit, to a base station, a data transmission; select a physical downlink control channel monitoring pattern based, at least, on the configuration and information of the data transmission; and perform, with a user equipment, physical downlink control channel monitoring based on the selected physical downlink control channel monitoring pattern.

In accordance with one example embodiment, an apparatus may comprise: processing circuitry; memory circuitry including computer program code, the memory circuitry and the computer program code configured to, with the processing circuitry, enable the apparatus to: receive a configuration for physical downlink control channel monitoring; transmit, to a base station, a data transmission; select a physical downlink control channel monitoring pattern based, at least, on the configuration and information of the data transmission; and perform, with a user equipment, physical downlink control channel monitoring based on the selected physical downlink control channel monitoring pattern.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for performing: receiving a configuration for physical downlink control channel monitoring; transmitting, to a base station, a data transmission; selecting a physical downlink control channel monitoring pattern based, at least, on the configuration and information of the data transmission; and performing physical downlink control channel monitoring based on the selected physical downlink control channel monitoring pattern.

The means may be further configured to perform: receiving a transmission while performing the physical downlink control channel monitoring, wherein the transmission may comprise one of: an acknowledgement of the data transmission, a scheduling grant for a subsequent transmission, or a radio resource control release message.

The configuration for physical downlink control channel monitoring may comprise an indication of at least one of: one or more small data transmission specific search spaces, one or more small data transmission specific search space groups, or one or more small data transmission specific physical downlink control channel monitoring skipping configuration(s), wherein the indication may be associated with at least one trigger, wherein the selecting of the physical downlink control channel monitoring pattern may be based on the at least one trigger.

The at least one trigger may comprise at least one of: whether the data transmission includes a buffer status report or a buffer status report index, a content of the data transmission, use of a physical random access channel preamble dedicated to small data transmission, reference signal received power information included with the data transmission, reference signal received quality information included with the data transmission, a power headroom report included with the data transmission, one or more random access resources used for the data transmission, a physical downlink control channel monitoring pattern indicated with the apparatus to a network, whether the base station previously served the apparatus, an amount of pending data for small data transmission, a type of the pending data for small data transmission, a size of a buffer of the data transmission, a size of a buffer of at least one predetermined logical channel group of the data transmission, or a signaling radio bearer or data radio bearer associated with the pending data for small data transmission.

The at least one predetermined logical channel group may comprise at least one of: at least one logical channel group with a priority above a threshold level, at least one logical channel group having at least one predetermined priority, at least one logical channel allowed for small data transmission, or at least one network configured logical channel group.

The configuration for physical downlink control channel monitoring may be received via one of: a system information block, dedicated radio resource control signaling, or a radio resource release message.

The selected physical downlink control channel monitoring pattern may include a back-off timer.

The data transmission may comprise at least one of: an initial transmission in a small data transfer procedure, or a subsequent transmission in the small data transfer procedure.

In accordance with one example embodiment, a non-transitory computer-readable medium comprising program instructions stored thereon which, when executed with at least one processor, cause the at least one processor to: receive a configuration for physical downlink control channel monitoring; transmit, to a base station, a data transmission; select a physical downlink control channel monitoring pattern based, at least, on the configuration and information of the data transmission; and perform, with a user equipment, physical downlink control channel monitoring based on the selected physical downlink control channel monitoring pattern.

The example non-transitory computer-readable medium may be further configured to: receive a transmission while performing the physical downlink control channel monitoring, wherein the transmission may comprise one of: an acknowledgement of the data transmission, a scheduling grant for a subsequent transmission, or a radio resource control release message.

The configuration for physical downlink control channel monitoring may comprise an indication of at least one of: one or more small data transmission specific search spaces, one or more small data transmission specific search space groups, or one or more small data transmission specific physical downlink control channel monitoring skipping configuration(s), wherein the indication may be associated with at least one trigger, wherein selecting the physical downlink control channel monitoring pattern may be based on the at least one trigger.

The at least one trigger may comprise at least one of: whether the data transmission includes a buffer status report or a buffer status report index, a content of the data transmission, use of a physical random access channel preamble dedicated to small data transmission, reference signal received power information included with the data transmission, reference signal received quality information included with the data transmission, a power headroom report included with the data transmission, one or more random access resources used for the data transmission, a physical downlink control channel monitoring pattern indicated with the user equipment to a network, whether the base station previously served the user equipment, an amount of pending data for small data transmission, a type of the pending data for small data transmission, a size of a buffer of the data transmission, a size of a buffer of at least one predetermined logical channel group of the data transmission, or a signaling radio bearer or data radio bearer associated with the pending data for small data transmission.

The at least one predetermined logical channel group may comprise at least one of: at least one logical channel group with a priority above a threshold level, at least one logical channel group having at least one predetermined priority, at least one logical channel allowed for small data transmission, or at least one network configured logical channel group.

The configuration for physical downlink control channel monitoring may be received via one of: a system information block, dedicated radio resource control signaling, or a radio resource release message.

The selected physical downlink control channel monitoring pattern may include a back-off timer.

The data transmission may comprise at least one of: an initial transmission in a small data transfer procedure, or a subsequent transmission in the small data transfer procedure.

In accordance with another example embodiment, a non-transitory program storage device readable by a machine may be provided, tangibly embodying a program of instructions executable by the machine for performing operations, the operations comprising: receive a configuration for physical downlink control channel monitoring; transmit, to a base station, a data transmission; select a physical downlink control channel monitoring pattern based, at least, on the configuration and information of the data transmission; and perform, with a user equipment, physical downlink control channel monitoring based on the selected physical downlink control channel monitoring pattern.

In accordance with one example embodiment, an apparatus may comprise: at least one processor; and at least one memory including computer program code; the at least one memory and the computer program code configured to, with the at least one processor, cause the apparatus at least to; transmit, to a user equipment, a configuration for physical downlink control channel monitoring; receive, from the user equipment, a data transmission; select a physical downlink control channel monitoring pattern based, at least, on the configuration and at least one of: information of the data transmission, or a physical random access channel preamble received from the user equipment; and transmit, to the user equipment, a transmission based on the selected physical downlink control channel monitoring pattern.

The transmission may comprise one of: an acknowledgement of the data transmission, a scheduling grant for a subsequent transmission, or a radio resource control release message.

The configuration for physical downlink control channel monitoring may comprise an indication of at least one of: one or more small data transmission specific search spaces, one or more small data transmission specific search space groups, or one or more small data transmission specific physical downlink control channel monitoring skipping configuration(s), wherein the indication may be associated with at least one trigger, wherein selecting the physical downlink control channel monitoring pattern may be based on the at least one trigger.

The at least one trigger may comprise at least one of: whether the data transmission includes a buffer status report or a buffer status report index, a content of the data transmission, the physical random access channel preamble received from the user equipment, reference signal received power information included with the data transmission, reference signal received quality information included with the data transmission, a power headroom report included with the data transmission, one or more random access resources used for the data transmission, a physical downlink control channel monitoring pattern indicated with the user equipment to the apparatus, whether the apparatus previously served the user equipment, an amount of pending data for small data transmission, a type of the pending data for small data transmission, a size of a buffer of the data transmission, a size of a buffer of at least one predetermined logical channel group of the data transmission, or a signaling radio bearer or data radio bearer associated with the pending data for small data transmission.

The at least one predetermined logical channel group may comprise at least one of: at least one logical channel group with a priority above a threshold level, at least one logical channel group having at least one predetermined priority, at least one logical channel allowed for small data transmission, or at least one network configured logical channel group.

The example apparatus may be further configured to: transmit the configuration for physical downlink control channel monitoring via one of: a system information block, dedicated radio resource control signaling, or a radio resource release message.

The selected physical downlink control channel monitoring pattern may include a back-off timer.

The data transmission may comprise at least one of: an initial transmission in a small data transfer procedure, or a subsequent transmission in the small data transfer procedure.

Transmitting the transmission may comprise the example apparatus being further configured to: transmit the transmission with a time and/or frequency resource selected based on the selected physical downlink control channel monitoring pattern.

In accordance with one aspect, an example method may be provided comprising: transmitting, to a user equipment, a configuration for physical downlink control channel monitoring; receiving, from the user equipment, a data transmission; selecting a physical downlink control channel monitoring pattern based, at least, on the configuration and at least one of: information of the data transmission, or a physical random access channel preamble received from the user equipment; and transmitting, to the user equipment, a transmission based on the selected physical downlink control channel monitoring pattern.

The transmission may comprise one of: an acknowledgement of the data transmission, a scheduling grant for a subsequent transmission, or a radio resource control release message.

The configuration for physical downlink control channel monitoring may comprise an indication of at least one of: one or more small data transmission specific search spaces, one or more small data transmission specific search space groups, or one or more small data transmission specific physical downlink control channel monitoring skipping configuration(s), wherein the indication may be associated with at least one trigger, wherein the selecting of the physical downlink control channel monitoring pattern may be based on the at least one trigger.

The at least one trigger may comprise at least one of: whether the data transmission includes a buffer status report or a buffer status report index, a content of the data transmission, the physical random access channel preamble received from the user equipment, reference signal received power information included with the data transmission, reference signal received quality information included with the data transmission, a power headroom report included with the data transmission, one or more random access resources used for the data transmission, a physical downlink control channel monitoring pattern indicated with the user equipment to a base station, whether the base station previously served the user equipment, an amount of pending data for small data transmission, a type of the pending data for small data transmission, a size of a buffer of the data transmission, a size of a buffer of at least one predetermined logical channel group of the data transmission, or a signaling radio bearer or data radio bearer associated with the pending data for small data transmission.

The at least one predetermined logical channel group may comprise at least one of: at least one logical channel group with a priority above a threshold level, at least one logical channel group having at least one predetermined priority, at least one logical channel allowed for small data transmission, or at least one network configured logical channel group.

Transmitting the configuration for physical downlink control channel monitoring may be performed via one of: a system information block, dedicated radio resource control signaling, or a radio resource release message.

The selected physical downlink control channel monitoring pattern may include a back-off timer.

The data transmission may comprise at least one of: an initial transmission in a small data transfer procedure, or a subsequent transmission in the small data transfer procedure.

The transmitting of the transmission may comprise transmitting the transmission with a time and/or frequency resource selected based on the selected physical downlink control channel monitoring pattern.

In accordance with one example embodiment, an apparatus may comprise: circuitry configured to perform: transmit, to a user equipment, a configuration for physical downlink control channel monitoring; receive, from the user equipment, a data transmission; select a physical downlink control channel monitoring pattern based, at least, on the configuration and at least one of: information of the data transmission, or a physical random access channel preamble received from the user equipment; and transmit, to the user equipment, a transmission based on the selected physical downlink control channel monitoring pattern.

In accordance with one example embodiment, an apparatus may comprise: processing circuitry; memory circuitry including computer program code, the memory circuitry and the computer program code configured to, with the processing circuitry, enable the apparatus to: transmit, to a user equipment, a configuration for physical downlink control channel monitoring; receive, from the user equipment, a data transmission; select a physical downlink control channel monitoring pattern based, at least, on the configuration and at least one of: information of the data transmission, or a physical random access channel preamble received from the user equipment; and transmit, to the user equipment, a transmission based on the selected physical downlink control channel monitoring pattern.

In accordance with one example embodiment, an apparatus may comprise means for performing: transmitting, to a user equipment, a configuration for physical downlink control channel monitoring; receiving, from the user equipment, a data transmission; selecting a physical downlink control channel monitoring pattern based, at least, on the configuration and at least one of: information of the data transmission, or a physical random access channel preamble received from the user equipment; and transmitting, to the user equipment, a transmission based on the selected physical downlink control channel monitoring pattern.

The transmission may comprise one of: an acknowledgement of the data transmission, a scheduling grant for a subsequent transmission, or a radio resource control release message.

The configuration for physical downlink control channel monitoring may comprise an indication of at least one of: one or more small data transmission specific search spaces, one or more small data transmission specific search space groups, or one or more small data transmission specific physical downlink control channel monitoring skipping configuration(s), wherein the indication may be associated with at least one trigger, wherein the selecting of the physical downlink control channel monitoring pattern may be based on the at least one trigger.

The at least one trigger may comprise at least one of: whether the data transmission includes a buffer status report or a buffer status report index, a content of the data transmission, the physical random access channel preamble received from the user equipment, reference signal received power information included with the data transmission, reference signal received quality information included with the data transmission, a power headroom report included with the data transmission, one or more random access resources used for the data transmission, a physical downlink control channel monitoring pattern indicated with the user equipment to the apparatus, whether the apparatus previously served the user equipment, an amount of pending data for small data transmission, a type of the pending data for small data transmission, a size of a buffer of the data transmission, a size of a buffer of at least one predetermined logical channel group of the data transmission, or a signaling radio bearer or data radio bearer associated with the pending data for small data transmission.

The at least one predetermined logical channel group may comprise at least one of: at least one logical channel group with a priority above a threshold level, at least one logical channel group having at least one predetermined priority, at least one logical channel allowed for small data transmission, or at least one network configured logical channel group.

Transmitting the configuration for physical downlink control channel monitoring may be performed via one of: a system information block, dedicated radio resource control signaling, or a radio resource release message.

The selected physical downlink control channel monitoring pattern may include a back-off timer.

The data transmission may comprise at least one of: an initial transmission in a small data transfer procedure, or a subsequent transmission in the small data transfer procedure.

The means configured to perform transmitting of the transmission may be further configured to perform: transmitting the transmission with a time and/or frequency resource selected based on the selected physical downlink control channel monitoring pattern.

In accordance with one example embodiment, a non-transitory computer-readable medium comprising program instructions stored thereon which, when executed with at least one processor, cause the at least one processor to: transmit, to a user equipment, a configuration for physical downlink control channel monitoring; receive, from the user equipment, a data transmission; select a physical downlink control channel monitoring pattern based, at least, on the configuration and at least one of: information of the data transmission, or a physical random access channel preamble received from the user equipment; and transmit, to the user equipment, a transmission based on the selected physical downlink control channel monitoring pattern.

The transmission may comprise one of: an acknowledgement of the data transmission, a scheduling grant for a subsequent transmission, or a radio resource control release message.

The configuration for physical downlink control channel monitoring may comprise an indication of at least one of: one or more small data transmission specific search spaces, one or more small data transmission specific search space groups, or one or more small data transmission specific physical downlink control channel monitoring skipping configuration(s), wherein the indication may be associated with at least one trigger, wherein selecting the physical downlink control channel monitoring pattern may be based on the at least one trigger.

The at least one trigger may comprise at least one of: whether the data transmission includes a buffer status report or a buffer status report index, a content of the data transmission, the physical random access channel preamble received from the user equipment, reference signal received power information included with the data transmission, reference signal received quality information included with the data transmission, a power headroom report included with the data transmission, one or more random access resources used for the data transmission, a physical downlink control channel monitoring pattern indicated with the user equipment to a base station, whether the base station previously served the user equipment, an amount of pending data for small data transmission, a type of the pending data for small data transmission, a size of a buffer of the data transmission, a size of a buffer of at least one predetermined logical channel group of the data transmission, or a signaling radio bearer or data radio bearer associated with the pending data for small data transmission.

The at least one predetermined logical channel group may comprise at least one of: at least one logical channel group with a priority above a threshold level, at least one logical channel group having at least one predetermined priority, at least one logical channel allowed for small data transmission, or at least one network configured logical channel group.

The example non-transitory computer-readable medium may be further configured to: transmit the configuration for physical downlink control channel monitoring via one of: a system information block, dedicated radio resource control signaling, or a radio resource release message.

The selected physical downlink control channel monitoring pattern may include a back-off timer.

The data transmission may comprise at least one of: an initial transmission in a small data transfer procedure, or a subsequent transmission in the small data transfer procedure.

Transmitting the transmission may comprise the example non-transitory computer-readable medium being further configured to: transmit the transmission with a time and/or frequency resource selected based on the selected physical downlink control channel monitoring pattern.

In accordance with another example embodiment, a non-transitory program storage device readable by a machine may be provided, tangibly embodying a program of instructions executable by the machine for performing operations, the operations comprising: transmit, to a user equipment, a configuration for physical downlink control channel monitoring; receive, from the user equipment, a data transmission; select a physical downlink control channel monitoring pattern based, at least, on the configuration and at least one of: information of the data transmission, or a physical random access channel preamble received from the user equipment; and transmit, to the user equipment, a transmission based on the selected physical downlink control channel monitoring pattern.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. An apparatus comprising:

at least one processor; and at least one memory storing instructions that, when executed by the at least one processor, cause the apparatus at least to:

receive a configuration for physical downlink control channel monitoring;

transmit, to a base station, a data transmission, wherein the data transmission comprises an initial transmission in a small data transfer procedure, and a subsequent transmission in the small data transfer procedure;

select a physical downlink control channel monitoring pattern based, at least, on the configuration and information of the data transmission, wherein the configuration for physical downlink control channel monitoring comprises an indication of:

one or more small data transmission specific search spaces, one or more small data transmission specific search space groups, and one or more small data transmission specific physical downlink control channel monitoring skipping configurations, wherein the indication is associated with at least one trigger, wherein selecting the physical downlink control channel monitoring pattern is based on the at least one trigger, wherein the at least one trigger comprises:

whether the data transmission includes a buffer status report or a buffer status report index, a content of the data transmission, use of a physical random access channel preamble dedicated to small data transmission, reference signal received power information included with the data transmission, reference signal received quality information included with the data transmission, a power headroom report included with the data transmission, one or more random access resources used for the data transmission, a physical downlink control channel monitoring pattern indicated with the user equipment to a network, whether the base station previously served the user equipment, an amount of pending data for small data transmission, a type of the pending data for small data transmission, a size of a buffer of the data transmission, a size of a buffer of at least one predetermined logical channel group of the data transmission, and a signaling radio bearer or data radio bearer associated with the pending data for small data transmission, wherein the at least one predetermined logical channel group comprises:

at least one logical channel group with a priority above a threshold level, at least one logical channel group having at least one predetermined priority, at least one logical channel allowed for small data transmission, and at least one network configured logical channel group;

perform, with a user equipment, physical downlink control channel monitoring based on the selected physical downlink control channel monitoring pattern;

receive a transmission while performing the physical downlink control channel monitoring, wherein the transmission comprises:

an acknowledgement of the data transmission, a scheduling grant for a subsequent transmission, and a radio resource control release message.

* * * * *